United States Patent
Varma

(10) Patent No.: US 8,005,067 B2
(45) Date of Patent: Aug. 23, 2011

(54) METHOD FOR COMMUNICATION INFORMATION RECALL IN AN ENTERPRISE NETWORK

(75) Inventor: Prathrap Raj Varma, Magarpatta (IN)

(73) Assignee: Avaya Inc., Basking Ridge, NJ (US)

( * ) Notice: Subject to any disclaimer, the term of this patent is extended or adjusted under 35 U.S.C. 154(b) by 232 days.

(21) Appl. No.: 12/290,494

(22) Filed: Oct. 31, 2008

(65) Prior Publication Data
US 2010/0111275 A1    May 6, 2010

(51) Int. Cl.
H04L 12/28    (2006.01)
H04L 12/66    (2006.01)

(52) U.S. Cl. .................................. 370/351; 370/352
(58) Field of Classification Search .................. None
See application file for complete search history.

(56) References Cited

U.S. PATENT DOCUMENTS

| | | | | |
|---|---|---|---|---|
| 5,727,047 A * | 3/1998 | Bentley et al. | ............. | 379/93.05 |
| 7,409,050 B1 * | 8/2008 | Li et al. | ............. | 379/142.01 |
| 2004/0179672 A1 * | 9/2004 | Pagel et al. | ............. | 379/266.1 |
| 2008/0101553 A1 * | 5/2008 | Goldman et al. | ............. | 379/45 |
| 2009/0245494 A1 * | 10/2009 | Sullivan et al. | ............. | 379/133 |

* cited by examiner

Primary Examiner — Ayaz R Sheikh
Assistant Examiner — Blanche Wong
(74) Attorney, Agent, or Firm — Christopher & Weisberg, P.A.

(57) ABSTRACT

A method is disclosed for communication information recall in an enterprise network. An illustrative embodiment describes, in particular, a method for communication information recall following a communication attempt by an originating party using a first communication terminal, to a receiving party using a second communication terminal, after retrieval by recipient, at the first communication terminal accessing an entry in an outgoing call log originated an earlier call that has been terminated; the entry accessed corresponding to the second communication terminal, sending/transmitting an instruction message to the second terminal indicative of an instruction to, to one of match and delete an existing communication information entry; informing the recipient about the action by adding a new entry in the communication information log with updated details; sending an alert of success or failure of communication information recall to the first communication terminal.

10 Claims, 3 Drawing Sheets

METHOD FOR COMMUNICATION INFORMATION RECALL IN AN ENTERPRISE NETWORK

FIELD OF THE INVENTION

The present invention relates to a method for communication information recall using a voice over IP (VoIP) terminal associated with an enterprise network. More particularly, the present invention relates to recalling SMS [short message service]/push messages and/or recalling a missed call entry from a recipient's call log.

DISCUSSION OF THE PRIOR ART

In published U.S. Patent Application US20050198180, there is described a system of communication through the Internet relating to the management of electronic mail ("e-mail") contacts. Entries are added to an address book of contacts to which the user has sent an email or from which the user has received an email so that a sorted email address list is presented to the user. The system limits the addresses from which a user would select the address needed and store mobile numbers in the address book for sending messages.

Published U.S. Patent Application US20070263789 discloses a system and methodology that enables a caller to retract a voice message from a recipient's voice mailbox prior to retrieval by a recipient. A telephone call is received by a network from the calling party who desires to cancel a message left for the recipient through an earlier call from the calling party to the recipient after termination of the earlier call. By mapping the calling party's automatic number identifier (ANI) with at least one call record, a voice mailbox of the recipient may be accessed to determine whether the message has been retrieved by the recipient.

Published U.S. Patent Application US20050124360 teaches a method of transmitting and deleting a short message in which a sender's mobile phone generates a short message, transmits it, and stores its transmission-related information. A receiver's mobile phone receives and stores the short message. The sender's mobile phone transmits a delete request message to the receiver's mobile phone, requesting deletion of the short message. The receiver's mobile phone searches for the short message in response to receipt of the delete request message and deletes the short message from a storing area so that it will not be visually displayed the next time messages are reviewed by the receiver's mobile phone.

SUMMARY OF THE INVENTION

A method for communication information recall in a voice over IP (VoIP) communication network following a communication attempt by an originating party using a first communication terminal, to a receiving party using a second communication terminal, each communication terminal including a microphone, a speaker, and a display for displaying communication information sent and received, after retrieval by the recipient. An illustrative embodiment of the invention comprises accessing, at the first communication terminal, an entry in an outgoing call log created as the result of an earlier call that was not answered by the receiving party, the entry accessed corresponding to the second communication terminal.

The illustrative method further includes a step of transmitting an instruction message to the second terminal that is indicative of an instruction to one of match and delete an existing communication information entry and a step of informing the recipient about the action by adding a new entry in the communication information log with updated details. The illustrative method further includes a step of receiving, at the first communication terminal, a notification of at least one of whether the communication information was successfully recalled before being read by the recipient and whether the second terminal was simply notified of the attempt.

The communication information to be recalled in accordance with the illustrative embodiment of the present invention includes unanswered (missed) calls, SMS [Short Message Service] messages, or push messages initiated by the first communication terminal and sent to the second communication terminal. In accordance with an especially preferred embodiment, the step of transmitting is initiated by depressing a pushbutton aligned with an entry of the outgoing call log displayed on the display of the first communication terminal.

Optionally, a method in accordance with the present invention may include a step of appending a status code indicative of the originating party's attempt to delete an existing call log entry, if an existing call log entry has already been previously accessed by a user of the second communication terminal, and supplying a notification to a user of the second communication terminal that the existing call entry has been altered. By way of illustrative example, the notification may be supplied by displaying a portion of a call log and/or by pushing a notification message to the screen being viewed by the user of the communication terminal.

The notification message may, optionally, be displayed on at least one of the display of the second communication terminal, the screen of a computer terminal associated with the user of the second communication terminal, and the display of a handheld mobile terminal associated with the user of the second communication terminal.

In accordance with an alternate embodiment of the present invention, a method for recalling communication information in a VoIP communication network following a communication attempt by an originating party using a first communication terminal to a receiving party using a second communication terminal, each communication terminal including a microphone, a speaker, and a display for displaying communication information sent and received comprises, at the second communication terminal, adding one of an unanswered call entry, a missed SMS message, or a missed push message to a call log maintained by the second communication terminal.

The alternate embodiment of the present invention further includes receiving at the second communication terminal an instruction message indicative of an instruction to one of match and delete an existing communication information entry and information about the action by adding a new entry in the communication information log with updated details.

The alternate embodiment further includes transmitting a notification from the second communication terminal to the first communication terminal indicating that the communication information was recalled without having been seen by a user of the second communication terminal, that the communication information could not be recalled before being seen by the user, or that a supplemental entry was made to the call log maintained by the second terminal and seen by the user of the second communication terminal.

By way of illustrative example, the step of transmitting a notification message is initiated by depressing a button aligned with a displayed entry of the incoming call log of the second communication terminal.

These and other advantages of the invention will be apparent to those skilled in the art by reference to the following detailed description and the accompanying drawings.

DETAILED DESCRIPTION OF THE PREFERRED EMBODIMENT

Before the embodiments are explained in detail, it is to be understood that the invention is not limited in its application to the details of the examples set forth in the following description or illustrated in figures. Embodiments of the invention will be described with reference to accompanying drawings wherein like numbers represent like elements throughout. Also, it is to be understood that the phraseology and terminology used herein is for the purpose of description and should not be regarded as limiting.

It should be noted that the invention is not limited to any particular software language may be described or implied in the figures. One of ordinary skill in the art will understand that a variety of alternative software languages may be used for implementation of the invention and based on a reading of the detailed description, would understand that in at least one embodiment, components in the method and system may be implemented in software or hardware.

Figure 1:
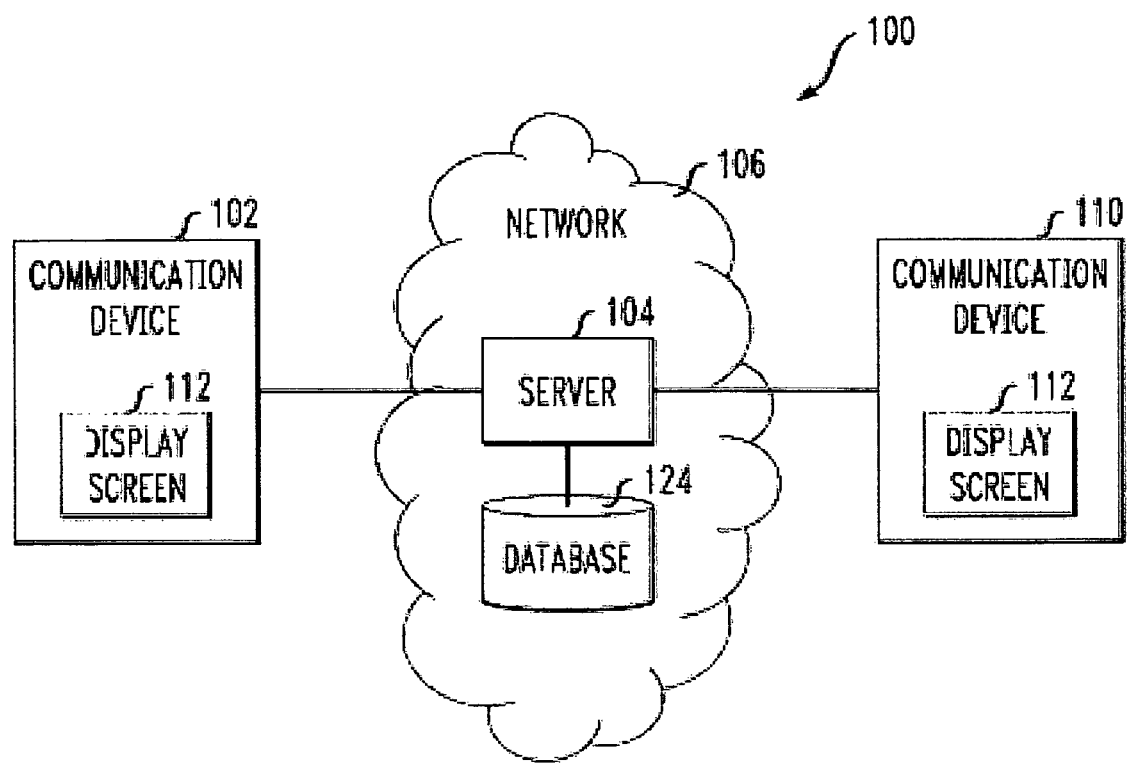
FIG. 1: schematic diagram of system architecture in accordance with an aspect of the invention.

FIG. 1 is a schematic diagram of system architecture in accordance with an aspect of the invention.

FIG. 1 shows a communications system 100 comprising two or more communication devices 102, 110 interconnected by at least one communications network 106. Each device 102, 110 has a display screen 112 and at least one key to recall the communication information. Within network 100, devices 102, 110 connected to, and served by, a server 104. Alternatively, each device 102, 110 may be served by a different server of network 106. Communications system 100 may be any desired communications system that uses the Session Initiation Protocol (SIP) or H.323 or any protocol to establish and control communications between devices 102, 100. By way of example only, network 106 comprises a data/voice network such as the Internet or a local area network, server 104 comprises a DHCP server or file server and communication devices 102, 100 comprise any desired devices such as wired or wireless VoIP telephones, personal digital assistants, personal computers, etc. Other than that it uses the SIP protocol, the type and structure of the system 100 or any of its components is immaterial. As described so far, system 100 is conventional.

According to an aspect of the invention, server 104 has access to a CM log database 124.

Within server(s) 104, each device 102, 110 is administered with its properties. These properties include the address, the phone number of the device, security certificate, recipient number, calling party number and stamp. Time stamp comprises of calling party's date and time with seconds.

Figure 2A:
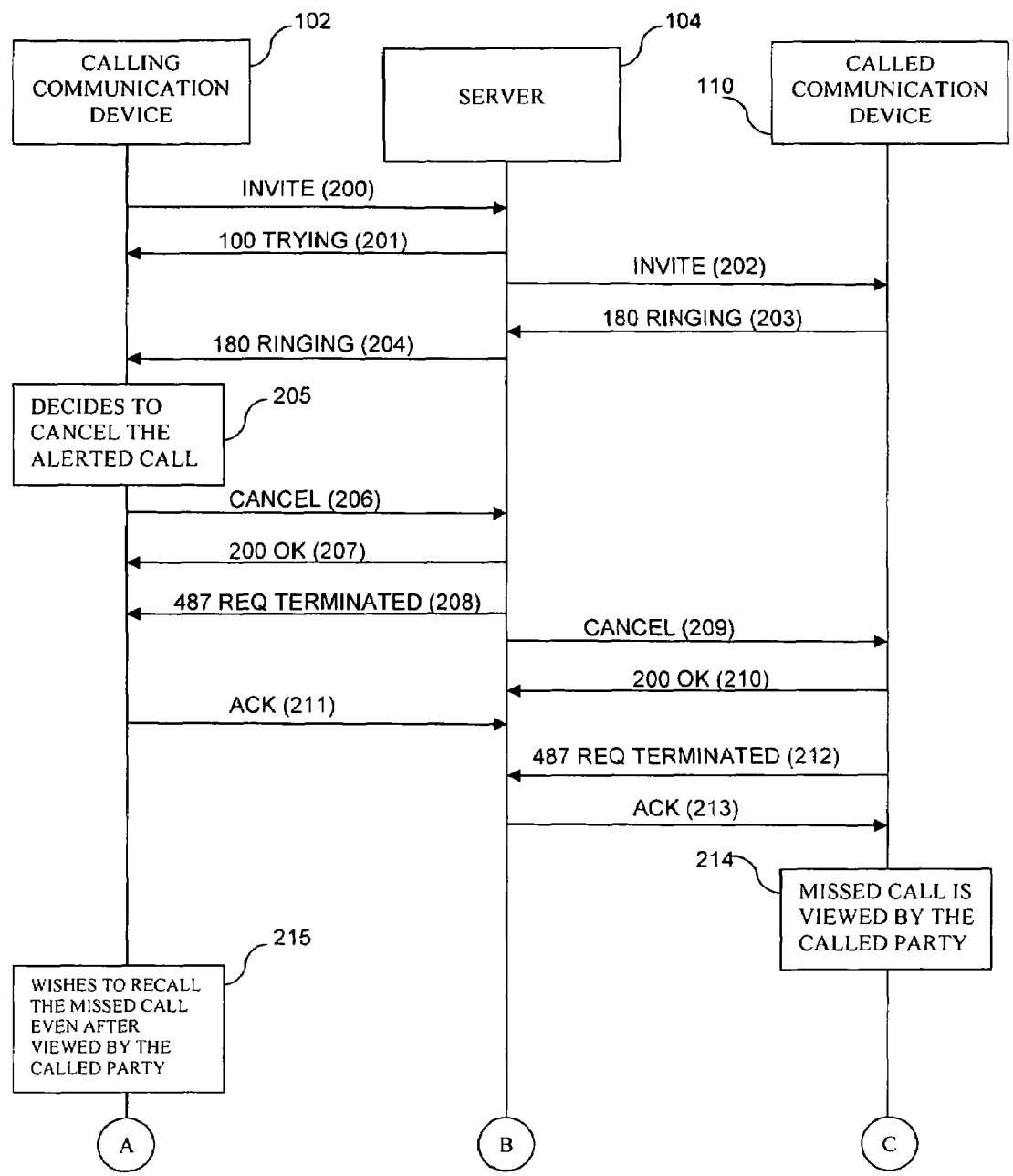
FIGS. 2A and 2B: flow diagram of a method for carrying out an aspect of the present invention
Figure 2B:
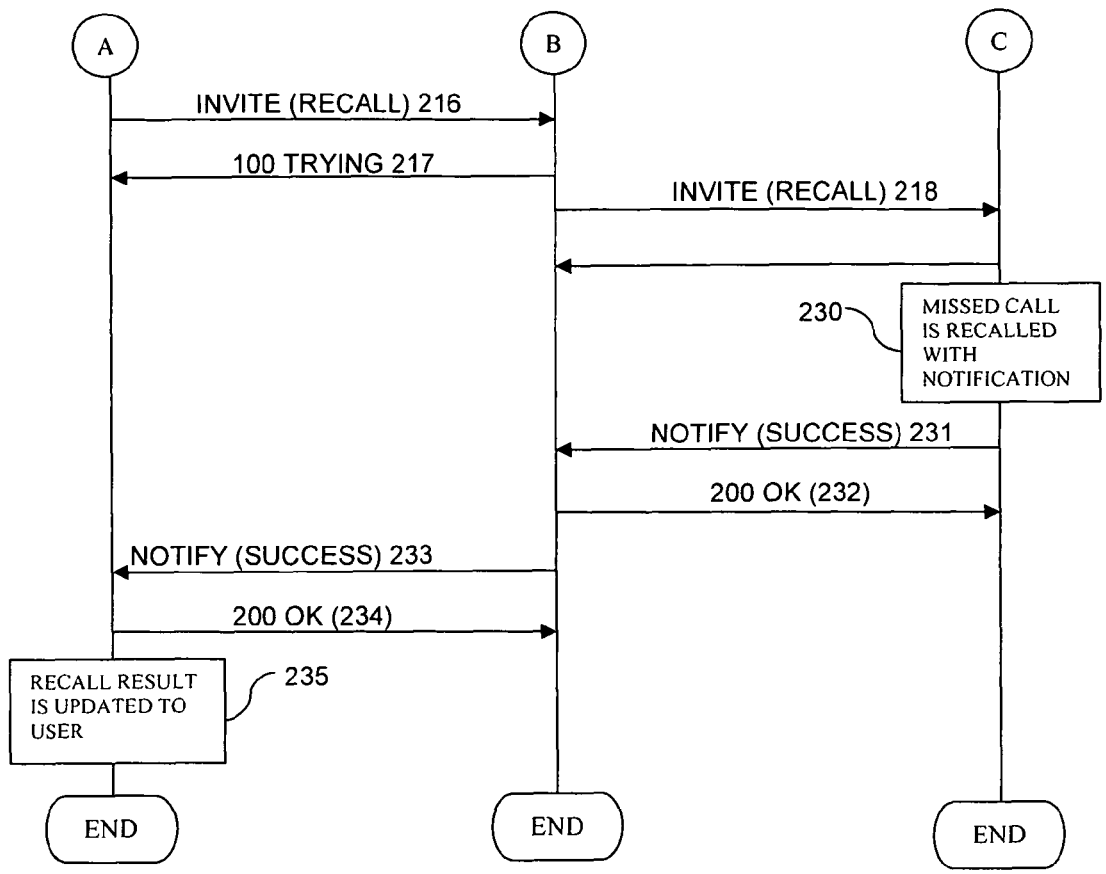

FIGS. 2A and 2B assumes that a user of communication device 102 is the calling party and that a user of communication device 110 is a recipient. When the calling party initiates a call to the recipient, communication device 102 sends a conventional SIP "INVITE" request to server 104, at step 200. Once server receives the invite message/request, Server 104 immediately responds with "100 TRYING" [to inform the calling party not to send any re-invite until any further response from the server] to calling party at step 201. The server 104 forwards the invite 202 to recipient 110. Once the recipient is alerted, it sends "180 RINGING" response back to the server 104 which in turn forwards the "180 RINGING" to the recipient 110. The calling party 102 decides to disconnect/cancel the ringing call and goes on hook on the phone at 205. This action send's a "CANCEL" message at step 206 from calling party 102 to the server 104, this in turn responds with a "200 OK" at step 207. The Server 104 cancels the pending transaction of INVITE with a "487 REQUEST TERMINATED" message at step 208 to the calling party 102 which had initiated the CANCEL request and also forwards the "CANCEL" to the recipient 110 at step 209. The calling party 102 acknowledges the transaction with an "ACK" at step 211. After the recipient 110 receives the "CANCEL" message, it immediately responds with "200 OK" at step 210, stops alerting and replies back to the server 104 with a "487 REQUEST TERMINATED" at step 208. The server 104 acknowledges with an "ACK" to the recipient 110 at step 213. Due to the cancellation of the ringing call by the calling party 102, leaves a missed call in the call log of the recipient 110 at 214.

The calling party 102 wishes to RECALL the missed call from the recipient call log at 215 even after the missed call being viewed by the recipient 110. The action on calling party 102 will send an "INVITE" message containing all the details that is sent to recall the missed call at step 216. The server 104 immediately responds with "100 TRYING" at step 217 and then forwards the "INVITE" to the recipient 110 at step 218.

The recipient 110, will notify the server 104 with a "NOTIFY" message at step 231 with success or failure. Thus the server 104 will respond with "200 OK" at step 232 and forwards the "NOTIFY" to the calling party 102 at step 233. The calling party 102 responds to the "NOTIFY" from the server 104 with "200 OK" step 234. The success or failure to recall the message will be displayed to the calling party 102 at step 235.

Of course, various changes and modifications to the illustrative embodiment described above will be apparent to those skilled in the art. According to the present invention a server is a network entity capable of handling the voice traffic in an IP network. In this context, communication information request message signal comprises of details like security certificate, called party number, calling party number, call-id and the time stamp. Time stamp comprises of calling party's date and time with seconds. A security certificate is a key that is sent from the phone for authentication. Usually the phone challenges the server with its certificate for authentication. Any request from the phone to the server will always be challenged by the server without which the request will not be processed. Call-id is a unique identification number that is generated by the phone to identify the call. So, when the recall request is made, first the authentication will be checked by the server. If authentication succeeds, the request will be forwarded to the called party phone. When the recall request reaches the called party phone, the phone's software will process the request accordingly.

Further, the illustrative embodiment described above will remain same except instead of call log their would be Inbox and the new details will have the sender, new time stamp, "Recalled" followed by the original SMS message along with the old time stamp in case of SMS and push message recall.

I claim:

1. A method for communication information recall in a voice over IP network following a communication attempt by a first communication terminal to a second communication terminal where the second communication terminal has accessed a specific entry in an information log maintained by the second communication terminal, the method comprising the first communication terminal:

transmitting an instruction message to the second communication terminal, the instruction message including an instruction to delete the specific communication entry in the communication information log maintained by the second communication terminal, the specific communication entry corresponding to the communication attempt, the instruction message triggering the second communication terminal to add an updated entry in the communication information log maintained by the second communication terminal; and receiving a notification message indicating whether the specific communication entry was deleted from the information log maintained by the second communication terminal.

2. The method of claim 1, wherein the specific communication entry is one of a missed call message, a Short Message Service (SMS) message, and a push message.

3. The method of claim 1, wherein the transmitting is initiated by depressing a button aligned with an entry of an outgoing call log displayed on a display of the first communication terminal.

4. The method of claim 3, wherein the instruction triggers the second communication terminal to supply a notification message.

5. The method of claim 4, further comprising displaying the notification message on at least one of a display of the second communication terminal, a screen of a computer terminal associated with the second communication terminal and a display of a mobile terminal associated with the second communication terminal.

6. A method for communication information recall in a voice over IP network following a communication attempt by a first communication terminal to a second communication terminal, the method comprising the second communication terminal:

adding a communication information entry to a call log maintained by the second communication terminal, the added communication entry corresponding to the communication attempt by the first communication terminal;

receiving a message containing an instruction to delete only the added communication information entry;

if the added communication information entry was not altered before being accessed by a user, transmitting a notification message to the first communication terminal indicating that the communication information entry was not altered before being accessed by a user; and if the added communication information entry was altered before being accessed by a user, adding an updated communication information entry to the call log maintained by the second communication terminal indicating the communication information entry has been altered.

7. The method of claim 6, wherein the second communication terminal transmits a message responsive to depressing a button aligned with a displayed communication information entry of the call log.

8. A method for communication information recall in a voice over IP network following a communication attempt by a first communication terminal to a second communication terminal, the method comprising the second communication terminal:

adding a communication information entry to a call log maintained by the second communication terminal, the communication entry corresponding to the communication attempt by the first communication terminal;

receiving a message containing an instruction to delete only the added communication information entry;

adding an updated communication information entry to the call log indicating the added communication information entry has been altered; and transmitting a notification message to the first communication terminal indicating that an updated communication entry was made to the call log and accessed by a user.

9. A computer readable medium having recorded processor executable instructions that when executed perform the method of claim 1.

10. A computer readable medium having recorded processor executable instructions that when executed perform the method of claim 6.

* * * * *

UNITED STATES PATENT AND TRADEMARK OFFICE
CERTIFICATE OF CORRECTION

| | | |
|---|---|---|
| PATENT NO. | : 8,005,067 B2 | Page 1 of 1 |
| APPLICATION NO. | : 12/290494 | |
| DATED | : August 23, 2011 | |
| INVENTOR(S) | : Prathap Raj Varma | |

It is certified that error appears in the above-identified patent and that said Letters Patent is hereby corrected as shown below:

In the Inventor name, replace "Prathrap" with -- Prathap --.

Signed and Sealed this
Eighth Day of November, 2011

David J. Kappos
*Director of the United States Patent and Trademark Office*

UNITED STATES PATENT AND TRADEMARK OFFICE
CERTIFICATE OF CORRECTION

PATENT NO.       : 8,005,067 B2
APPLICATION NO.  : 12/290494
DATED            : August 23, 2011
INVENTOR(S)      : Prathap Raj Varma It is certified that error appears in the above-identified patent and that said Letters Patent is hereby corrected as shown below:

Title Page, Item (75) Inventor, replace "Prathrap" with -- Prathap --.

This certificate supersedes the Certificate of Correction issued November 8, 2011.

Signed and Sealed this
Sixth Day of December, 2011

David J. Kappos
*Director of the United States Patent and Trademark Office*